Oct. 17, 1967 D. VON SANDEN ET AL 3,347,992

CIRCUIT ARRANGEMENT CONTROLLING THE RELEASE OF LINES IN A COMMUNICATION SYSTEM

Filed Sept. 18, 1963 2 Sheets-Sheet 1

Oct. 17, 1967 D. VON SANDEN ETAL 3,347,992

CIRCUIT ARRANGEMENT CONTROLLING THE RELEASE OF LINES IN A COMMUNICATION SYSTEM

Filed Sept. 18, 1963 2 Sheets-Sheet 2

United States Patent Office 3,347,992
Patented Oct. 17, 1967

3,347,992

CIRCUIT ARRANGEMENT CONTROLLING THE RELEASE OF LINES IN A COMMUNICATION SYSTEM

Dieter Von Sanden, Munich-Solln, Germany, and Hubert Suckfüll, Phoenix, Ariz., assignors to Siemens & Halske Aktiengesellschaft, Berlin and Munich, Germany, a corporation of Germany Filed Sept. 18, 1963, Ser. No. 309,658
Claims priority, application Germany, Sept. 19, 1962, S 81,521
24 Claims. (Cl. 179—15)

ABSTRACT OF THE DISCLOSURE

Circuit arrangement for controlling switching operations in a communication system wherein the respective subscriber line loops are periodically successively tested as to their operating condition, wherein means is provided for storing a criterion indicating an open line loop in connection with a read subscriber line, comparable with means responsive to the occurrence of such criterion and the storage of such a criterion responsive to the preceding reading of the subscriber line involved, to effect a release of the corresponding connection.

Figure 1:
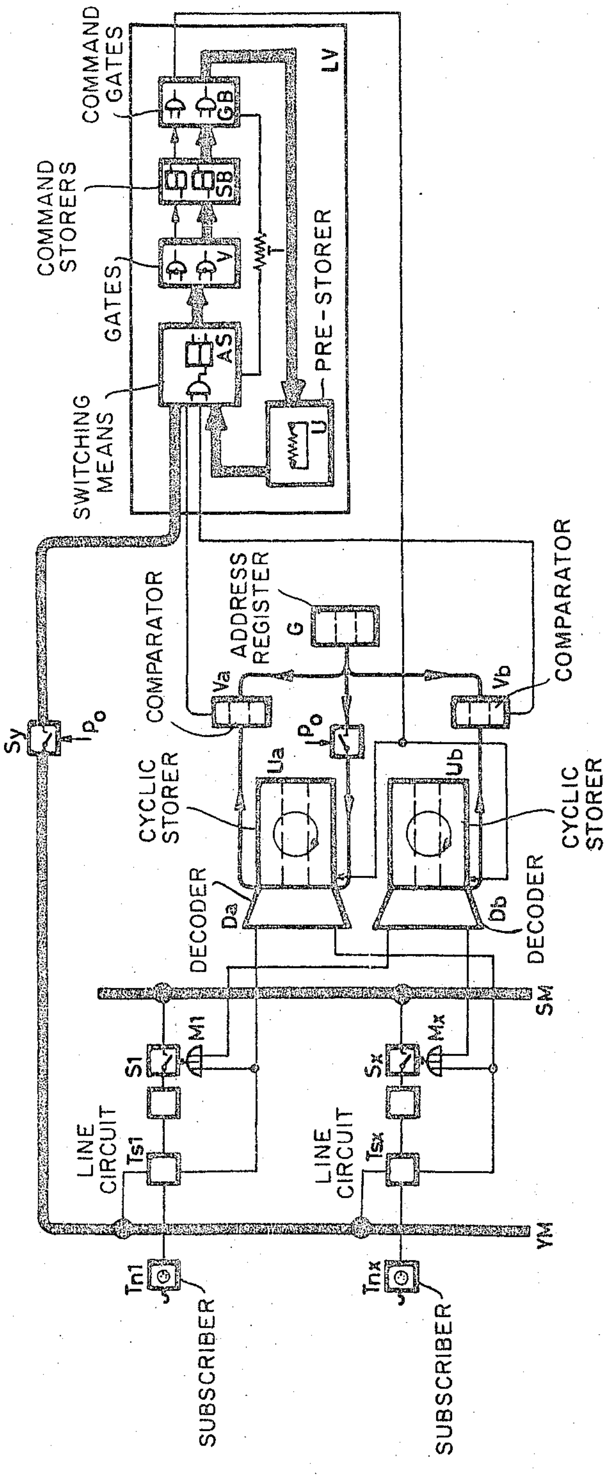

The invention disclosed herein is concerned with a circuit arrangement for controlling switching operations in a communication system, particularly a telephone system.

In communication systems, and particularly in telephone systems, the condition of individual lines leading for instance to the subscribers must be continuously monitored or supervised to ascertain whether the line loops of given subscriber lines are open or closed, in order to be able to effect required switching operations as a function of the condition of the respective loops or of changes in the condition of the respective loops. Such a supervision of subscriber lines can be basically effected in accordance with two different principles: The lines can be continuously supervised as to their condition of operation, as is customary in conventional telephone switching technique, which can be effected for instance with the aid of so-called battery feed bridge relays, or the individual subscriber lines can be periodically and successively tested at given instants, as to their operating condition.

The invention described herein is concerned with a switching system in which the individual subscriber lines are supervised as to their respective condition of operation, in accordance with the latter principle, that is, to a switching system in which the lines leading to the individual subscribers are successively periodically in pulse-wise fashion tested as to whether the respective subscriber line loops are open or closed. Such a switching system may for instance be a time multiplex switching system in which the messages to be exchanged are modulated onto impulse sequences which are staggered with respect to each other, thus permitting a multiple utilization of connecting paths, which pulse sequences are respectively associated with the connections made. When a reading pulse which is in such a system is fed to the line circuit of a subscriber who has just placed a call, finds in said line circuit the conditions prevailing upon an interruption of the line loop, a criterion which indicates the interruption of the loop will be transmitted via a signal line to a control mechanism. If the control mechanism finds that the respective subscriber has up to now not been a party to a call, no switching operations need be brought about in response to such criterion; if, however, the subscriber was up to then participating in a call, and if he has now again replaced the receiver, then the criterion transmitted to the control mechanism which indicates upon pulse-wise reading of the subscriber line the interruption of the line loop, must cause the release of the connection in which the respective subscriber has participated.

Such an impulse-wise reading (testing) of subscriber lines as to their condition of operation requires rapidly responding switching means to take up and process the information obtained in each case. It has been found in this connection that a defective or faulty response and operation of the respective switching means can be brought about specifically because of the high operating speed necessary for the switching means which receive and process the information. There may occur the case that if, during the pulsing time interval during which a line is tested as to its condition of operation, the same conditions prevail in the corresponding subscriber line circuit as when the subscriber in question has hung up, even though the subscriber in question has not actually replaced the receiver. Such a condition can be caused in the subscriber line circuit, for instance, by external interfering signals coupled into subscriber line. It is also possible that the subscriber in question is just giving off a signal, for instance a dial impulse, in the form of an interruption of the loop. In both cases, the control mechanism will receive a criterion indicating an interruption of the loop in the case of the subscriber line which is being tested as to its condition of operation, as a result of which, as set forth above, the control mechanism will cause the release of the respective connection; however, this is not desirable in the last mentioned cases, since in these cases the subscriber in question has not replaced the receiver.

The present invention provides an arrangement which overcomes the above mentioned difficulties. The circuit arrangement according to the invention is provided for controlling switching operations in a switching system, particularly a telephone system, in which the lines leading to the individual subscribers are successively and periodically tested impulse-wise as to their condition of operation, that is, as to whether the respective subscriber loops are closed or open, to which circuit arrangement are fed the criteria produced in the respective subscriber line circuits, the circuit arrangement evaluating in each case an incoming criterion with respect to the switching operations to be effected.

This circuit arrangement is characterized by the provision of means for receiving a criterion indicating an interruption of the loop in the case of a subscriber which is being read, such criterion being stored in a pre-note storer as a function of further information obtained from at least one pre-note storer at a place corresponding to the subscriber address, unless such criterion has already been stored in a pre-note stored by the preceding testing of the respective subscriber line, said circuit arrangement giving a command for the release of the corresponding call as a function of the criterion indicating an interruption of the loop of the read subscriber line only if such criterion is already pre-noted from the preceding reading of the respective subscriber line.

An erroneous release of connections is prevented due to the fact that the circuit arrangement in accordance with the invention gives off a command for the release of a connection only when a criterion indicating an open loop on the part of the read subscriber line is confirmed upon the next reading of the respective subscriber line by the same criterion indicating an open loop on the part of the read subscriber line. In the event that an open loop is merely simulated due to an interference impulse or the like, at the moment of the reading of a subscriber line, the criterion which is obtained upon such reading, and which indicates an open loop of the subscriber line which has just been read as to its operating condition will be taken up by the circuit arrangement and noted in a pre-note storer, but upon the next impulse-wise reading of the respective subscriber line, this will not be confirmed by a similar criterion indicating an open subscriber line loop. Since the circuit arrangement in accordance with the invention, however, gives off a command to release the connection in question only when simultaneously a criterion indicating an open loop occurs in the case of the read subscriber line and such a criterion is already pre-noted from the preceding reading of the involved subscriber line, it will not give off any such command as a result of an interference impulse and the criterion fed in the pre-note storer and indicating a simulated interruption of the loop on the part of the read subscriber line will be erased. If instead of an interference impulse, signal impulses in the form of loop interruptions are involved, since no command to release the call in question has yet been given off by the circuit arrangement, before confirmation of a loop opening which has once been found, a signal receiver which is present in any event to receive such signal impulses, can immediately upon the receipt of such a signal impulse give off a blocking signal for the continued prevention of the release of the respective connection.

There are already known various methods and circuit arrangements for the elimination of interference impulses which appear on a line with respect to desired signal impulses occuring on the same line. In these known methods and circuit arrangements, the impulses are fed into a one-bit storer associated individually with the line which is then periodically read in impulse-wise fashion at time intervals which are substantially shorter than the smallest possible spacing between two signal impulses. Two successive scanning results are compared with each other, and an impulse which then indicates a stored signal impulse is extended only if a change in the condition of the storage of the one-bit storer associated with the respective line takes place or has taken place. All of these known methods and circuit arrangements are based on the condition that the interference impulses are chatter impulses which occur directly in front of or behind the signal impulses and that a given number of reading impulses is fed to the one-bit storer associated individually with a line, during an impulse block formed by a signal impulse with its chatter impulses, and the next pause between the impulses. Therefore, very specific time conditions must be maintained in order to effect a removal of interference impulses by utilizing as criterion for the extension of an impulse only a change in condition of the one-bit storer associated with the respective line. The circuit arrangement in accordance with the invention differs from these known circuit arrangements in that no such time conditions need be maintained for the reading of the subscriber lines and for the occurrence of interference impulses and the like on the subscriber lines and no storage elements need be associated individually with the subscriber lines. The circuit arrangement in accordance with the invention avoids the release of a connection based upon a switching condition prevailing only in impulse-like fashion in the line circut of a subscriber participating in a call, by giving off a command for the release of a connection only responsive to the occurrence of a criterion indicating an open line loop provided such criterion is already prenoted from the preceding reading of the respective subscriber line.

Further details of the invention will be brought out in the appended claims and in the description which is rendered below with reference to the accompanying drawings.

Figure 2:
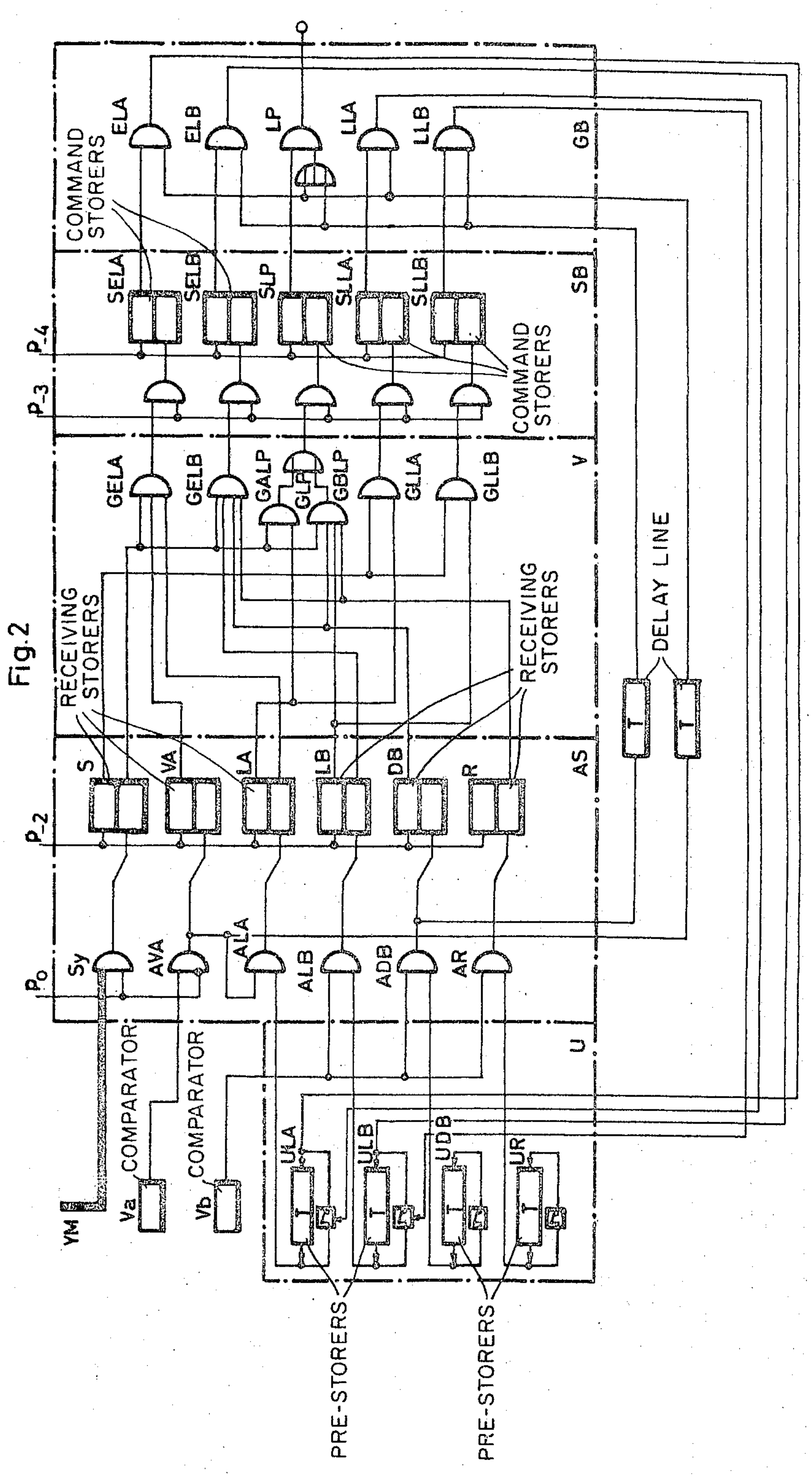

FIG. 1 shows in schematic manner an example of a time multiplex telephone switching system in which, the lines leading to the individual subscribers are to be successively periodically tested in impulse-wise fashion as to their condition of operation, to the extent necessary for an understanding of the invention, the system containing the circuit arrangement LV in accordance with the invention for the control of the respective switching operations; and FIG. 2 shows an example of the circuit of a switching arrangement for controlling switching operations in such system in accordance with the invention.

The construction and manner of operation of the time-multiplex switching system shown in FIG. 1 will first be described. In this switching system, subscribers T*n*1 . . . T*nx* are connected via line circuits T*s*1 . . . T*sx* and time channel switches S1 . . . S*x* with a speech multiplex bar SM. The time channel switches S1 . . . S*x* are periodically actuated in impulse-like fashion by control pulses which are mutually displaced in phase. The time channel switches of subscribers involved in a connection are operatively controlled in rhythm with a control pulse assigned to the respective connection. The impulses of the different control pulses have the same impulse sequence frequencies; the control pulses are so interlaced that one impulse of each of the other control pulses always occurs between two successive impulses of a control pulse. The control pulses are supplied by two cyclic storers U*a* and U*b* associated with corresponding decoders D*a* and D*b*. The cyclic storer U*a* is associated with those subscribers who are involved in outgoing traffic, while the cyclic storer U*b* is associated with subscribers who are involved in incoming traffic. In the cyclic storers U*a* and U*b*, are cycled the addresses of the respective subscribers so that they appear periodically at the respective storer outputs to which is connected in each case a decoder D*a* or D*b* respectively, which has as many outputs as there are subscribers. Each of these outputs is associated with a specific subscriber. When a decoder is fed the address of a subscriber, an impulse is given off at the output associated with such subscriber, which impulse serves to control the time channel switch associated with said subscriber. Each address cycling in a cyclic address storer U*a* or U*b* has a definite cycling phase. The pulse phases of the control pulses which actuate the time channel switches S1 . . . S*x* correspond to these cycling phases.

Let us assume that a special reading pulse of the same impulse sequence frequency is inserted in the cycle of the control pulses, which is used to read the lines leading to the individual subscribers T*n*1 . . . T*nx* as to their condition of operation, that is, as to whether the respective subscriber loop is closed or open. This reading pulse has a phase position of its own with respect to the other control pulses. The fixed phase displacement resulting therefrom between the reading pulse and the control pulses assures that even though both the time channel switches S1 . . . S*x*, as well as the subscriber line circuits T*s*1 . . . T*sx* are connected to the same outputs of the decoder D*a*, no mutual interference of the different functions to be carried out by the line circuits and the time channel switches will occur. The decoder D*a* can therefore be utilized both for controlling the time channel switches S1 . . . S*x* and for reading the subscriber line circuits T*s*1 . . . T*sx*.

In order that the decoder D*a* can supply not only the control pulses for the time channel switches *S*1 . . . S*x*, but also the reading pulses to be fed to the subscriber line circuits T*s*1 . . . T*sx*, the addresses of the subscribers to be read must be fed to the decoder in cyclic succession in each case at the reading pulse phase. In order to supply these addresses, there is provided an address register G in which the different addresses appear successively. As already described elsewhere, the addresses can occur in the form of an impulse code in which a given combination from a plurality of lines is marked in impulse-wise fashion; each subscriber having thereby his own combination. The address register is after conclusion of at least one cycle of the control pulses always advanced by one step, whereupon the next subscriber address appears. The addresses of the subscribers then stand in each case in the address register G at least for the length of a cycle of the control pulses. The outputs of the address register G are connected with the decoder D*a*, a switch being inserted in the connecting line, this switch being controlled by the reading pulse and being operative to feed an address to the decoder D*a* always precisely at the reading pulse phase $p_0$. Corresponding to the address fed in each case, the decoder D*a* gives off a reading impulse to the subscriber line circuit T*s* of the respective subscriber T*n*.

The reading impulses fed to the subscriber line circuits T*s*1 . . . T*sx* permit different criteria to appear there, depending on the instantaneous condition of operation of the subscriber line, that is, whether the subscriber loop is closed or open at the time. These criteria can, for instance, consist, in the one case, of the presence of an impulse and, while in the other case, the absence of an impulse. The criteria supplied by the subscriber line circuits T*s*1 . . . T*sx* are now in accordance with the invention fed to the circuit arrangement LV which is shown in the right-hand portion of FIG. 1. For this purpose, there is advantageously used a signal multiplex line YM which is common to all subscriber line circuits. The subscriber line circuits T*s*1 . . . T*sx* are then connected to this signal multiplex line YM extending to the circuit arrangement LV as can be noted from FIG. 1. In order that the circuit arrangement in accordance with the invention is fed only the criteria given off at the moment of the feeding of reading impulses from the subscriber circuits T*s*1 . . . T*sx*, there is inserted in the signal multiplex line YM a switch or gate S*y*, which is controlled by the reading impulse so that it is in each case capable of transmission only at the phase position $p_0$ of the reading pulse. The circuit arrangement in accordance with the invention thereby establishes each time a criterion as to the condition of the subscriber loop, namely the loop of the subscriber line which has just been read. The lines leading to the individual subscribers T*n*1 . . . T*nx* are in this manner successively periodically in impulse fashion tested as to their condition of operation. The time spacing with which a subscriber line is repeatedly read depends upon the impulse sequence frequency of the reading impulse which is equal to the impulse sequence frequency of the control pulse, and upon the number of subscribers included in the switching system. The impulse sequence frequency of the control pulses and thus also the impulse sequence frequency of the reading pulse must in this connection, as is known, be more than twice as high as the highest speech frequency to be transmitted. In practice there results from this an impulse sequence frequency of about 8 to 10 kilocycles. If about 1000 subscribers are included in a switching system, each subscriber will be read about 10 times per second. This reading sequence is sufficiently rapid to promptly recognize changes of the condition of operation of a subscriber line, that is, the removal or replacing of the receiver.

The criterion given off upon such reading of a subscriber line by the respective line circuit, and which indicates the condition of the corresponding loop is, as already mentioned, fed to a central control device which effects the required switching operations. Of this central control device, there is shown in FIG. 1 only the circuit arrangement LV in accordance with the invention which evaluates, with respect to switching operations to be effected, a criterion received thereby which indicates an open line loop on the part of a line which had been read. As can be noted from FIG. 1, the circuit arrangement LV is provided with switching means designated AS, which receive such a criterion indicating an open line loop, as well as further information. Such further information is given off, inter ala, from a pre-note storer, designated U in FIG. 1. The circuit according to the invention also has gate circuits designated V in FIG. 1 which are controlled by the switch means AS ahead thereof and serving to receive information. These gate circuits V, when fed the criterion indicating an open line loop and the non-feeding of such a criterion which has already been stored by the preceding reading of the respective subscriber line in a pre-storer U, give off a command for the storing of the criterion indicating the open line loop, into the pre-storer U at a position corresponding to the subscribed address. In case of the feeding both of the criterion indicating an open line loop and such a criterion already stored in the pre-storer U from the preceding reading of the respective subscriber line, such gate circuits give off a command for the release of the respective connection. As can be noted from FIG. 1, the command given off by the gates V is stored first in a command storer SB. Command gates GB are serially connected with the command storers SB, which are connected with the pre-storer U, as well as with the address cycling storers U*a* and U*b*, and, at the proper time, receive a control signal by which they are made capable of transmitting the command in question. Such a control signal can in this connection first be fed to the command gates GB as a function of the time at which information concerning the subscriber line which has just been read is received by the switch means AS, for which purpose the switch means AS serving to take up the information and the order gates GB are connected by a delay line designated T, the time delay of which is established in suitable manner, as will be presently explained in further detail.

Before explaining the operation of the circuit arrangement which has been described above, reference will be had to FIG. 2, which contains further details as to the circuitry thereof.

In the circuit arrangement of the invention shown in FIG. 2, there is provided a pre-note storer ULA and a pre-note storer ULB for the storage of those criteria which indicate open line loops of read subscriber lines which are involved respectively in outgoing and incoming calls. These pre-storers ULA and ULB can be formed by cyclc storers in which the stored criteria are in each case cycled with a phase which corresponds to the cycling phase with which the corresponding subscriber address cycles in the address cycling storer U*a* and U*b* respectively (see FIG. 1). Such a cyclic storer can, for instance, be formed by a delay line of magnetostrictive type, in connection with which the output is connected with the input line over a re-entering gate indicated in FIG. 2 by a normally closed contact. The delay line is thus, so to say, closed to form a ring, so that a pulse entered at the input occurs after the delay time T at the output of the delay line and is thus entered again at its input into the delay line so as to start another such cycling. The cyclic storers are so dimensioned that there can cycle in series therein as many impulses as can cycle in an address cycling storer U*a* or U*b* (see FIG. 1), so that an impulse can also cycle in the pre-storer ULA with the same pulse phase with which an address cycles in the address cycling storer U*a*. In addition to the pre-storers ULA and ULB, there are also provided other cyclic storers which are designated UR and UDB. In the cyclic storer UR, those cycling phases are marked by a cycling pulse at which, in each case, a subscriber participating in the call in incoming traffic is connected with a call-signal generator, while in the cyclic storer UDB there are marked by a cycling impulse those cycling phases at which is actuated the time-channel switch of a subscriber participating in an incoming call. The last two mentioned cyclic storers UR and UDB will be presently described more in detail.

As source of information for the circuit arrangement in accordance with the invention, there are shown in FIG. 2 the address comparators V*a* and V*b* which are also indicated in FIG. 1. The address comparator V*a* effects a comparison between the addresses cycling in the address cycling storer U*a* of the subscribers participating at the time in outgoing calls, with the address present for at least the duration of such an address cycling in the address register G of the subscriber line which had just been read as to the condition of the line loop. The address comparator V*b* compares in corresponding fashion the address of the subscirber who had just been read as to the condition of the line loop with the addresses, cycling in the address cycling storer U*b* of subscribers participating in incoming calls.

If the subscriber who had just been read is participating in a call, the corresponding address comparator establishes identity of address at the pulse phase associated with the respective connection and therefore gives off at its output, at this pulse phase, a signal which marks the corresponding pulse phase.

The circuit arrangement is provided for the receipt of the information required, with a series of receiving storers (AS) in series with each of which there is connected a gate which is capable of transmission only at the moment when the corresponding source of information gives off the information concerning the subscriber who has just been read as to the condition of the line loop. Thus there is provided for the feeding of the criterion indicating open line loop on the part of the subscriber just read, the recording storer S to which there is connected in series a gate Sy which is capable of transmission only at the reading pulse phase $p_0$. It may be pointed out in this connection that this gate Sy can coincide with the gate Sy shown in FIG. 1. The criterion indicating the condition of the loop of the subscriber just read is fed to the receiving storer S due to the fact that the gate Sy receives, at its control input only upon the reading pulse phase $p_0$, a control signal by which it is made conductive for the duration of said reading pulse phase. The receiving storer S is here, like the other receiving storers, shown so that the information to be taken up is fed thereto at the input shown on the bottom left. When this input is activated by a criterion which indicates a closure of the line loop, its output shown at the top right is activated while in case of non-activation of the information input, or upon the feeding of a criterion indicating an open line loop, the bottom right output of the receiving storer is activated.

For the receipt of the signal given off by the address comparator Va, which indicates that the subscriber who has just been read is participating in a call in outgoing traffic and at the same time marks the phase with which this call is made, there is provided the receiving storer VA, a barrier gate AVA being connected directly in series with the output of the address comparator and a barrier impulse being fed to its barrier input at the reading pulse phase $p_0$. The operation of this barrier gate results in the suppression of a signal given off by the address comparator VA at the reading pulse phase $p_0$.

The receiving storer LA is provided in order to receive the information given off by the pre-storer ULA concerning the subscriber who has just been read. Ahead of its information input there is connected the And-gate ALA, the control input of which is connected to the output of the barrier gate AVA. The receiving storer LA can therefore only receive information from the pre-storer ULA when the subscriber who has just been read is participating in a call, in outgoing traffic, the receiving storer LA being able to receive only that information from the pre-storer ULA which cycles therein with the phase associated with such call.

In corresponding manner, there are provided, for the receipt of the information possibly given off by the further cyclic storers ULB, UDB and UR, the additional receiving storers LB, DB and R; in each case an And-gate ALB, ADB, AR is connected ahead of said receiving storers, their respective control input being connected to the output of the address comparator VB. In similar manner, as explained above for gate ALA, the three last mentioned gates are therefore capable of transmitting only when the subscriber who has just been read is participating in a call in incoming traffic and they are also capable of transmitting only at the pulse phase associated with such call, so that the succeeding receiving storers are capable of also receiving only the information cycling at this pulse phase in one of the cyclic storers ULB, UDB or UR.

In order to evaluate the information received by the switching means designated in their entirety by AS in FIG. 2, there are employed the gate circuits designated as a whole by V. The two And-gates GELA and GELB are in this connection provided for the storing of a criterion indicating an open line loop on the part of a read subscriber. The first input of these And-gates is respectively connected to the lower output of the receiving storer S which, as has been mentioned above, is activated upon detection of the said criterion. The second input of the two And-gates GELA and GELB is respectively connected to the upper output of the receiving storers LA and LB which are activated in the manner which will be presently described in further detail, upon the absence of such a criterion already stored from the preceding reading of the involved subscriber in the corresponding pre-storer ULA or ULB, respectively. The third input of the And-gate GELA is connected to the output of the receiving storer V*a* which is activated upon the feeding of a signal given off by the address comparator VA, while the third input of the And-gate GELB is connected to the corresponding output of the receiving storer DB. To the third input of one of the two said And-gates, a signal is therefore fed when the subscriber who has just been read is participating in a call. The And-gate GELB has a fourth input which is connected to the output of the receiving storer R which is is activated upon the non-receipt of a signal.

Two further And-gates GALP and GBLP are provided to give off a command for the release of a call (connection). The first input in each case of these two And-gates is again connected to the aforementioned output of the receiving storer S which is activated upon detection of the criterion indicating an open line loop on the part of a read subscriber. The second input in each case of the And-gates is connected to the output of the corresponding receiving storer LA or LB respectively already stored from the preceding reading of the respective subscriber in the pre-storer ULA or ULB respectively entering into consideration. The And-gate GBLP has also two additional inputs which are connected to the aforementioned outputs of the further receiving storers DB and R. The outputs of the two And-gates GALP and GBLP are combined via an Or-gate GLP. It may be pointed out in this connection that insofar as only the subscriber participating in a call in outgoing traffic (A-subscriber) is to be able to cause the release of a call, the Or-circuit GLP as well as the And-circuit GBLP which is associated with the subscriber participating in a call in incoming traffic (B-subscriber), can be dispensed with. On the other hand, the Or-gate GLP, however, can also have another input to which a command for the release of a call may be fed from another point.

Finally, there are also provided, for the erasing of a criterion stored in a pre-storer ULA or ULB and indicating an open line loop on the part of a read subscriber, the two And-gates GLLA and GLLB, the first input of each of which is connected to the input of the receiving storer S, which is activated upon absence of a criterion indicating an open line loop, while the second input of each such gate is connected to the output of the corresponding receiving storer LA or LB, respectively, which is activated in case of the presence of such a criterion already stored from the preceding reading of the respective subscriber in the pre-storer ULA or ULB.

In order to be able to give off in each case at the desired time, the commands which are produced by the gate circuits designated in their entirety by V, by combination of the information fed thereto, there is arranged in series with each gate a command storer, there being possibly also provided between the gate and the command storage a gate which by feeding a corresponding signal to its control input, enables the storing of the respective command at a desired instant. From the command storers designated as a whole by SB, the commands stored there can then always be given off at a desired instant. This can be obtained by placing at the control input of the gate ELA, which is disposed in series with the corresponding order storer SELA, at the desired moment a signal which makes the corresponding gate conductive. To the output of the gate ELA which transmits a pre-entry command produced by means of the And-gate GELA, there is connected the recording (writing-in) input of the pre-storer ULA; in corresponding manner, the recording (writing-in) input of the pre-storer ULB is connected to the output of the gate ELB which transmits a pre-entry command produced by the And-gate GELB. To the output of the gate LLA or LLB respectively, transmitting an erasure order produced by and the And-gate GLLA or GLLB respectively, is connected the barrier input of the re-recording re-writing gate of the pre-storer ULA or ULB, respectively. The output of the gate LP which transmits a release command is extended, as can be noted from FIG. 1, to the address cycling storers U*a* and U*b*, at which a release command occurring at a given phase effects the erasure of the subscriber addresses present just at this phase at the output of the address cycling storers.

The circuit arrangement according to the invention, described above with reference to FIGS. 1 and 2, operates as follows:

Let us assume that in the course of a cycle of control pulses at the reading pulse phase $p_o$, a subscriber T*n*1 (see FIG. 1) is read as to the condition of the line loop. During this cycle of control pulses, therefore, the address of the subscriber T*n*1 is in the address register G and is fed from there at the scanning pulse phase $p_o$ to the decoder D*a* so that the decoder D*a* gives-off at the reading pulse $p_o$ a reading impulse to the subscriber line circuit T*s*1. Let us further assume that the subscriber T*n*1 is just participating in a call in outgoing traffic, so that his address cycles in the address cycling storer U*a*, with the pulse phase associated with such call, but just at this instant when the reading impulse is fed to the line circuit T*s*1, conditions similar to those of an open loop prevail in such line circuit, that is, conditions such as exist when the receiver at the subscriber station T*n*1 is replaced. Consequently, over the signal multiplex line YM and the gate S*y*, which is conductive at the scanning pulse phase $p_o$ there is transmitted a criterion indicating an open line loop for the subscriber T*n*1 who has just been read. This criterion is stored in the receiving storer S. Within the same cycle of control pulses at the pulse phase $p_n$, which is associated with the call in which the subscriber T*n*1 is participating, a signal is given off by the address comparator V*a*, which signal is taken up by the receiving storer VA via the barrier gate AVA which is capable of transmission outside the scanning pulse phase $p_o$. The other receiving storers—assuming that during the preceding reading of the subscriber T*n*1, the line loop was closed—remain in their normal position into which all receiving storers have been brought directly before the reading pulse phase $p_o$ at a preceding pulse phase $p_2$. Under the conditions described above, the coincidence condition is satisfied for the And-gate GELA so that a signal occurs at the output of such gate. At a suitable time, in particular directly before the start of the next following cycle of the control pulses, the command storers SELA . . . are restored to normal position at a pulse phase $p_4$, and upon the following pulse phase $p_3$, the gates disposed ahead of the command storers are made conductive by a signal fed to their control inputs so that the command given off by the And-gate GELA is transmitted to the command storer SELA and stored therein. From the output of the command storer SELA, a signal is given off at the instant when the serially disposed gate ELA is conductive. This command gate ELA now has its control input connected to a delay line T which has its input connected to the output of the barrier gate AVA, and the delay time of which is so dimensioned that a command gate receives a control signal at the same cycling phase, at which during the preceding cycle of control pulses a signal relating to the subscriber who has just been read, was given off by an address comparator V*a* or V*b*. At the same cycling phase $p_n$, therefore, the criterion stored in the command storer SELA is transmitted via the gate ELA to the recording (writing-in) input of the pre-storer ULA, so that the criterion indicating an open line loop on the part of the subscriber T*n*1 just read now cycles in the pre-storer ULA with the same pulse phase $p_n$ as that with which the address of the subscriber T*n*1 cycles in the address cycling storer U*a* and which is associated with the call in which the subscriber T*n*1 is participating.

In corresponding manner, during the next cycles of the control pulses, the further subscribers are read as to the condition of their line loops until finally, after for instance about 1000 scanning cycles, the subscriber T*n*1 is again read as to the condition of the line loop. This subscriber T*n*1 may still be participating in the aforementioned call in outgoing traffic, and the criterion indicating a closed line loop may now also be transmitted from the subscriber line circuit T*s*1 to the circuit arrangement according to the invention and be taken up there by the receiving storer S at the pulse phase $p_o$. At the connecting pulse phase $p_n$, the receiving storer VA again takes up from the address comparator V*a* a signal, a signal also occurs at the output of the pre-storer ULA, namely, the criterion coming from the preceding reading of the subscriber T*n*1 and indicating an open line loop at the read subscriber T*n*1. This criterion is taken up via the gate ALA by the receiving storer LA so that its upper output is activated. Under these conditions, the coincidence condition of the And-gate GLLA is now satisfied so that at the output of the gate GLLA, an erasure command occurs at the cycling phase $p_n$ for the criterion stored in the cyclic storer ULA. In the manner already described for command given off by the And-gate GELA, the command given off by the And-gate GLLA is also taken up by a command storer, namely, the command storer SLLA, in order to be transmitted from there by the command gate LLA which has just been made conductive at the pulse phase $p_n$ via the delay line T connected with the output of the address comparator V*a* to the barrier input of the re-recording gate of the pre-storer ULA. The re-recording gate therefore blocks the re-recording of the open-loop criterion cycling up to then at the cycling phase $p_n$, whereby said criterion is erased in the pre-storer ULA.

If, it is assumed in contradistinction to the assumptions made above, that a subscriber T*n*1 participating up to now in a call in incoming traffic, has actually replaced the receiver, then upon the first reading of the subscriber after he has replaced the receiver, the same operations take place as have been described above in connection with the first reading of the subscriber. Upon the scanning of the subscriber T*n*1, repeated for instance after about 1000 cycles of control pulses, his subscriber circuit T*s*1 now again gives a criterion indicating an open line loop, which criterion is taken up again by the receiving storer S at the scanning pulse phase $p_o$. Within the same control cycle, at the control pulse phase $p_n$ associated with the previous call in which the subscriber T*n*1 was participating, there is given off by the address comparator V*a* a signal which is taken up by the receiving storer VA and at the same time—as already explained—fed also into the delay line T connected to the barrier gate AVA. At the same pulse phase $p_n$, there again occurs at the output of the pre-storer ULA the criterion pre-noted from the preceding reading of the subscriber T*n*1 and indicating an open line loop, and it is transmitted from the gate ALA, which is conductive at this pulse phase $p_n$, to the receiving storer LA. Upon receiving such information at the receiving storers S and LA, the coincidence condition for the And-gate GALP is satisfied, so that at the output of the latter, and thus also at the output of the succeeding Or-gate GLP, there occurs a signal which represents a command to release the respective call. Shortly before the start of the next control cycle, this signal is transmitted, in a manner similar to the operations already described, to the command storer SLP. In the course of the next control cycle, thereupon, a control signal is fed to the control gate LP, over the delay line T connected with the output of the barrier gate AVA, precisely at the control pulse phase $p_n$ so that the release command, stored in the command storer SLP, is given off precisely at this pulse phase $p_n$ and is transmitted, as can be noted from FIG. 1, to the address cycling storers U*a* and U*b*. At the output of the address cycling storer U*a*, there is present at this pulse phase $p_n$ the address of the read subscriber T*n*1 while at the output of the address cycling storer U*b* there is present, at the same phase $p_n$, the address of the subscriber with whom the subscriber T*n*1 who was just read, was previously connected. Based upon the release command, given off by the circuit arrangement according to the invention at the pulse phase $p_n$, the addresses cycling up to now at this pulse phase $p_n$ in the address cycling storers U*a* and U*b* are erased, whereby the call between the two subscribers is released.

The operations described above for a subscriber who is participating in a call in outgoing traffic, take place in principle in the same manner also upon the reading of a subscriber participating in a call in incoming traffic.

At any rate, a criterion, indicating an open line loop on the part of a read subscriber, is taken up by the circuit arrangement and stored as a function of information taken up from the pre-storers at a place corresponding to the subscriber address in the respective pre-storer, unless such a criterion has already been stored from the preceding reading of the respective subscriber, in the corresponding pre-storer, and only as a result of the fact that upon the occurrence of a criterion indicating an open line loop at the read subscriber, such a criterion is already noted from the preceding reading of the respective subscriber, is a command for the release of the call emitted, while, if upon the occurrence of a criterion indicating a closed line loop at the read subscriber, a criterion indicating an open line loop has already been entered from the preceding reading of the subscriber, said pre-noted criterion is erased in the pre-storer. In this way there is obtained in all cases the result that a condition corresponding to an open line loop which prevails only in impulse-wise fashion in the subscriber line circuit of a subscriber and which is just picked up by an impulse-wise scanning of the subscriber with respect to the condition of the line loop, cannot lead to an erroneous release of the call in which the subscriber who has just been read is participating. The effects of an interference pulse which simulate an open line loop are automatically suppressed in the manner described above, while in the event that the subscriber is just giving off a signal in the form of one or more line loop openings, an erroneous release of the call can also be prevented, since the circuit arrangement according to the invention, before giving off such a release command, first awaits confirmation of a criterion indicating the open line loop from the next reading of the subscriber who has just been read, and in the meantime, a signal receiver, which is to be provided in any event for the receiving of the signals given off by the subscriber, can, after receiving such a signal impulse, in its turn give off a barrier signal by which a release of the call is prevented. Such a barrier signal can, for example, be an erasure command for the open-loop criterion stored in the cyclic sorer ULA or ULB at the respective cycling phase, by which, analogously to the above-described operations, the re-recording gate of the respective cyclic storer is blocked at the corresponding pulse phase.

As mentioned before, the operations described for the reading of a subscriber participating in a call in outgoing traffic, also apply in analogous fashion for the reading of a subscriber engaged in a call in incoming traffic. The changes involved merely require replacement of the pre-storer ULA by the pre-storer ULB, replacement of the receiving storer VA and LA by the receiving storers DB and LB, and replacement of the And-gates GELA, GALP and GLLA by the And-gates GELB, GBLP and GLLB. The same then also applies for the command storers SB and command gates GB arranged serially with said And-gates. However, there is provided a special feature in the embodiment shown in FIG. 2.

It is in this connection assumed that in the corresponding switching system, the signal generators necessary to build up the connections, and particularly the ringing-signal generator, are connected to the speech multiplex bar SM in the same way as subscribers, so that at a pulse phase which has been assigned to a connection desired by the calling subscriber, there is established a corresponding connection between the ringing-signal generator and the called subscriber, likewise by pulse-wise periodic actuation of the corresponding time channel switches. This connection continues until the called idle subscriber has removed his receiver. During this time, the connection to the called subscriber is already connected-through, that is, the time channel switch of the called idle subscriber is acuated. Accordingly, there is also marked in a cyclic storer UDB the cycling phase which is associated with this connection between the calling subscriber, the called subscriber and the call-signal generator. At the same time, the same cycling phase is marked in the cyclic storer UR, so long as the desired subscriber who is to participate in the call in incoming traffic, is being called. Upon the reading of such a subscriber who is still being called, therefore, not only the receiving storer DB but also the receiving storer R receives a signal. The two And-gates GELB and GBLP each have an input which is connected to the output of the receiving storer R which is not activated upon the receiving of such a signal. If, therefore, a subscriber who is just being called and has not yet picked up his receiver, so that his line loop is still open, is read as to the condition of the line loop, coincidence cannot occur either for the And-gate GELB or the And-gate GBLP despite the receiving of the criterion indicating the open line loop and the other required information. Therefore, neither the criterion indicating the open line loop of a subscriber who has just been read and is still being called, can be recorded in the pre-storer ULB, nor can a command for the release of the call, which has already been connected-through to the station of the called subscriber, be given off by the circuit arrangement according to the invention. A storage of a criterion indicating an open line loop and thus also the giving off of a command for releasing the call in question will therefore only be effected if the read subscriber is participating as speaking subscriber or at least as calling subscriber in a call. If the read subscriber, on the other hand, is participating in a call as a subscriber who is still being called, the corresponding connection will not be released despite the fact that the line loop is open.

Finally, it is also conceivable that at a pulse phase which has been associated with a connection desired by a subscriber, there is only a connection between said subscriber and the exchange switching device, the address of the subscriber asking for the connection and the address of the subscriber dialed by him cycling in the two address cycling storers U*a* and U*b* (see FIG. 1), without, however, a connection with the desired subscriber having come about, whether because the idle test of the desired subscriber has not yet been carried out or because the desired subscriber has been found to be busy. Since in such a case at the corresponding cycling phase, the time-channel switch of the desired subscriber is not actuated, the corresponding cycling phase is likewise not marked in the cyclic storer UDB, so that at this pulse phase, while the address comparator V*b* gives off a signal, the information receiving gate ADB remains blocked, and the circuit arrangement therefore receives no information at this pulse phase. Accordingly, the circuit arrangement according to the invention does not give off any command at this pulse phase, so that the partially built up connection between the calling subscriber and the exchange switching device is not released. The cyclic storer UDB and the serially disposed gate ADB can be dispenser with if there can cycle in the address cycling storer U*b* (see FIG. 1) aside from addresses of subscribers participating in calls in incoming traffic, only addresses of dialed subscribers who have been found to be idle.

Changes may be made within the scope and spirit of the appended claims which define what is believed to be new and desired to have protected by Letters Patent.

What is claimed is:

1. A circuit arrangement for controlling switching operations in a switching system, particularly a telephone system, in which the lines leading to individual subscribers are periodically successively tested in pulse-wise fashion as to the operating condition thereof, so as to ascertain whether the respective subscriber line loops are closed or open, wherein criteria produced in such testing in the respective subscriber line circuits are fed to said circuit arrangement and wherein a criterion received is evaluated with respect to the switching operations to be effected; comprising means for received a criterion indicating an open line loop in connection with a read subscriber line, pre-storer means, means for storing the received criterion in said pre-storer means at a point corresponding to the respective subscriber address, as a function of further information taken from said pre-storer, means in the absence of the storage of such a criterion in said pre-storer means responsive to the preceding reading of the respective subscriber, and means responsive to the occurrence of the criterion indicating the open loop and the storage of such a criterion in said pre-storer means resulting from the preceding reading of the respective subscriber, for imparting a command to effect release of the corresponding connection.

2. A circuit arrangement according to claim 1, comprising means for storing in a pre-storer the criterion indicating an open line loop only if the read subscriber is participating in a call as speaking or at least as calling subscriber.

3. A circuit arrangement according to claim 1, comprising a pre-storer respectively for the storage of the criteria indicating open line loops in the case of read subscribers who are participating in calls in outgoing traffic and for the storage of criteria indicating open line loops in the case of subscribers who are participating in calls in incoming traffic.

4. A circuit arrangement according to claim 1, wherein said pre-storers are cyclic storers in which the stored criteria cycle with a cycling phase corresponding to the cycling phase of the address of the respective subscriber.

5. A circuit arrangement according to claim 4, for use in a time multiplex switching system in which control pulses, which are mutually shifted in phase and respectively associated with the connections made, comprising time channel switches, said control pulses serving respectively for the control of the time channel switches for connecting the subscriber lines, the cycling phase with which a criterion indicating an open loop on the part of read subscriber, cycling in the pre-storer, being established by the phase of the control pulses controlling the time channel switch of the respective subscriber.

6. A circuit arrangement according to claim 5, comprising another cyclic storer for marking those cycling phases at which a subscriber participating in a call in incoming traffic is connected with a ringing signal generator.

7. A circuit arrangement according to claim 6, comprising a further cyclic storer for marking those cycling phases at which is actuated the time channel switch of a subscriber participating in a call in incoming traffic.

8. A circuit arrangement according to claim 1, comprising receiving storers for receiving respectively the criterion indicating an open line loop and the further information.

9. A circuit arrangement according to claim 8, comprising a gate disposed between each receiving storer and the corresponding information source, said gate being conductive only at the instant when the corresponding information source gives off the information concerning the subscriber just read.

10. A circuit arrangement according to claim 9, for use in a time multiplex switching system in which control pulses, which are mutually displaced in phase and respectively associated with calls which are being initiated, are being produced by means of the corresponding subscriber addresses, for the control of time channel switches connecting subscriber lines with each other, comprising an address cycling storer respectively for the addresses of subscribers with outgoing traffic and for the addresses of subscribers with incoming traffic, gates controlled with regard to their transmissibility, means for connecting the information input of the respective gates to one of the cyclic storers feeding information concerning subscribers respectively involved in outgoing traffic or in incoming traffic, means for connecting said gates during a cycling of said addresses in the address cycling storer via their control input to the output of an address comparator which effects a comparison between the address supplied by address register of the subscriber who has just been read and the addresses entered in the corresponding address cycling storer of the subscribers involved in outgoing traffic or in incoming traffic, respectively.

11. A circuit arrangement according to claim 10, for use in a time multiplex switching system in which, by means of a reading pulse of the pulse sequence frequency, inserted in the cycle of the control pulse, all lines are read successively as to their operating condition, a gate inserted in the signal line which transmits the criteria indicating loop interruptions, said gate being controlled by the reading impulse so that it is conductive only at the interrogation pulse phase.

12. A circuit arrangement according to claim 11, for use in a time multiplex switching system, in which at the phase of a reading pulse, inserted in the cycle of the control pulse and being of the same impulse repetition frequency, by means of which all lines are read successively as to their operating condition, there is fed to an address comparator, the address of the subscriber just read, a barrier gate which is non-conductive at the interrogation pulse phase being connected directly in series with the output of said address comparator.

13. A circuit arrangement according to claim 1, comprising And-gates for storing the criterion indicating an open line loop, the first input of each of said gates being connected to the output of the corresponding receiving storer which is activated upon ascertaining said criterion, the second input thereof being connected to the output of the corresponding receiving storer which is activated upon the absence of such a criterion already stored from the preceding reading of the respective subscriber in a pre-storer, and at the output of which appears, as a function of the activation of the said two inputs, a command for the storing of the ascertained criterion in the corresponding pre-storer.

14. A circuit arrangement according to claim 13, wherein each of the two And-gates has another input which is connected to the output of the corresponding receiving storer which is activated upon reception of information indicating that the read subscriber is participating in a call.

15. A circuit arrangement according to claim 14, wherein the And-gate which gives off a command for the storing of a criterion indicating an open line loop in connection with a read subscriber involved in incoming traffic, has a fourth input which is connected to the input of the corresponding receiving storer which is activated upon non-receipt of a signal from the cyclic storer for pulse phases at which a subscriber participating in a call in incoming traffic is connected to a ringing signal generator.

16. A circuit arrangement according to claim 1, comprising And-gates for giving-off a command for the release of a call, the first input of each such gate being connected to the output of the corresponding receiving storer which is activated upon ascertaining the criterion indicating an open line loop on the part of a read subscriber, the second input of each gate being connected to the output of the corresponding receiving storer activated upon the presence of such a criterion already stored, from the preceding reading of the respective subscriber, in a pre-storer and at the output of which appears a command for the release of the respective call as a function of the activation of the said two inputs.

17. A circuit arrangement according to claim 16, wherein the And-gate which gives off a command for the release of a connection upon reading of a subscriber participating in a call in incoming traffic, has a third input which is connected to the output of the corresponding receiving storer which is activated upon receipt of information indicating that the read subscriber is participating in a call in incoming traffic.

18. A circuit arrangement according to claim 17, wherein the respective And-gate has a fourth input which is connected to the output of the corresponding receiving storer which is activated upon non-receipt of a signal from the cyclic storer for cycling phases at which a subscriber participating in a call in incoming traffic is connected with a ringing signal generator.

19. A circuit arrangement according to claim 18, wherein the outputs of the two And-gates are combined via an Or-gate.

20. A circuit arrangement according to claim 1, comprising And-gates for the erasure of a criterion indicating an open line loop on the part of a read subscriber, which criterion has been fed into a pre-storer, the first input of each such gate being connected to the output of the corresponding receiving storer which is activated upon nondetection of a criterion indicating a line loop opening on the part of a read subscriber, the second input of which is connected to the output of the corresponding receiving storer which is activated upon the presence of such a criterion already stored in a pre-storer from the preceding of the respective subscriber, and at the output of which appears, upon activation of the two inputs, a command to erase the criterion fed from the preceding reading of the respective subscriber in the corresponding pre-storer.

21. A circuit arrangement according to claim 20, wherein a command storer is serially connected with each gate.

22. A circuit arrangement according to claim 21, comprising a further gate inserted between each said gate and the command storer connected serially with respect thereto, and means for feeding a signal to the control input of said further gate to effect at a desired instant the storing of the respective command.

23. A circuit arrangement according to claim 22, comprising a further gate disposed serially with respect to each storer, and means for feeding a signal to the control input of said further gate to effect at a desired instant the giving off of the respective command.

24. A circuit arrangement according to claim 23, wherein the control inputs of the respective command gates are respectively connected, via delay lines, with the input of the receiving storer which is activated upon the scanning of a subscriber participating in a call in outgoing or incoming traffic, the delay time of the respective delay lines being so dimensioned that a command gate receives a control signal at the same cycling phase at which the corresponding receiving storer was activated incident to a preceding cycling operation, so as to transmit the command stored in the command storer disposed ahead thereof to the corresponding pre-storer or address cycling storer, respectively.

References Cited

UNITED STATES PATENTS

| | | | |
|---|---|---|---|
| 2,293,724 | 5/1960 | Saal et al. | 179—15 |
| 2,957,949 | 10/1960 | James et al. | 179—15 |
| 3,271,521 | 9/1966 | Von Sanden et al. | 179—15 |

FOREIGN PATENTS

| | | |
|---|---|---|
| 1,293,724 | 4/1962 | France. |

JOHN W. CALDWELL, *Acting Primary Examiner.*

ROBERT L. GRIFFIN, *Assistant Examiner.*